(12) United States Patent
Francois

(10) Patent No.: US 8,833,436 B2
(45) Date of Patent: Sep. 16, 2014

(54) HEAT EXCHANGE ASSEMBLY EXCHANGING HEAT BETWEEN A FIRST AND A SECOND FLUID

(75) Inventor: Gilles Francois, Saint-Savin (FR)

(73) Assignee: Areva NP, Courbevoie (FR)

( * ) Notice: Subject to any disclaimer, the term of this patent is extended or adjusted under 35 U.S.C. 154(b) by 1433 days.

(21) Appl. No.: 12/282,190

(22) PCT Filed: Feb. 23, 2007

(86) PCT No.: PCT/FR2007/000329
§ 371 (c)(1),
(2), (4) Date: Sep. 9, 2008

(87) PCT Pub. No.: WO2007/104843
PCT Pub. Date: Sep. 20, 2007

(65) Prior Publication Data
US 2009/0050295 A1   Feb. 26, 2009

(30) Foreign Application Priority Data
Mar. 13, 2006 (FR) ...................................... 06 02188

(51) Int. Cl.
*F28F 7/00* (2006.01)
*F28F 9/02* (2006.01)
*F28D 9/00* (2006.01)
*F28D 21/00* (2006.01)

(52) U.S. Cl.
CPC ........... *F28D 9/0006* (2013.01); *F28F 2265/26* (2013.01); *F28D 2021/0054* (2013.01)
USPC ............. 165/81; 165/158; 165/159; 165/160; 165/161; 165/162

(58) Field of Classification Search
CPC ........... F28D 2012/0054; F28D 9/0006; F28F 2265/26
USPC .................................................... 165/158–160
See application file for complete search history.

(56) References Cited

U.S. PATENT DOCUMENTS 4,158,637 A * 6/1979 Jones ............................ 518/702
5,826,647 A * 10/1998 Engelhardt et al. ........ 165/134.1

(Continued)

FOREIGN PATENT DOCUMENTS

FR          2887618       12/2006
JP       2004-144422    *  5/2004

(Continued)

*Primary Examiner* — Alexandra Elve
*Assistant Examiner* — Henry Crenshaw
(74) *Attorney, Agent, or Firm* — Novak Druce Connolly Bove + Quigg LLP

(57) ABSTRACT

The heat exchange assembly (1) for exchanging heat between a first and a second fluid comprises: a plurality of heat exchange modules (12) for exchanging heat between the first and second fluids, these being distributed about a central axis (X) and having opposing respective lateral faces (47); feed manifolds (14, 16) for feeding the modules (12) with primary and secondary fluid and collection manifolds (18, 20) for removing these fluids. At least some of the said manifolds (14, 16) or parts of the said manifolds (18) run between the modules (12), the said manifolds (14, 16) or parts of manifolds (18) flanking one and the same module (12) being positioned substantially symmetrically with respect to the mid-plane situated between the two lateral faces (47) of the said module (12) in such a way that the said manifolds (14, 16) or parts of manifolds (18) create substantially identical thermal stresses in the lateral faces (47) of the module (12).

16 Claims, 11 Drawing Sheets

(56) References Cited

U.S. PATENT DOCUMENTS

| | | | | |
|---|---|---|---|---|
| 5,892,328 | A | * | 4/1999 | Shang et al. ............. 315/111.51 |
| 6,173,493 | B1 | * | 1/2001 | Dierbeck ................. 29/890.043 |
| 2001/0039809 | A1 | * | 11/2001 | Wada et al. ..................... 62/509 |
| 2006/0016476 | A1 | * | 1/2006 | Lecomte et al. ............. 137/100 |

FOREIGN PATENT DOCUMENTS

| | | | |
|---|---|---|---|
| JP | 2004144422 | 5/2004 | |
| JP | 2004144422 A * | 5/2004 | ............... F28F 9/26 |
| WO | WO-2007000507 | 1/2007 | |

* cited by examiner

HEAT EXCHANGE ASSEMBLY EXCHANGING HEAT BETWEEN A FIRST AND A SECOND FLUID

CROSS REFERENCE TO RELATED APPLICATIONS

This application is a National Phase filing under 35 U.S.C. §371 of PCT/FR2007/000329 filed Feb. 23, 2007, which claims priority to Patent Application No. 0602188, filed in France on Mar. 13, 2006. The entire contents of each of the above-applications are incorporated herein by reference.

The present invention relates in general to heat exchangers, in particular for high temperature nuclear reactors (HTR) or very high temperature nuclear reactors (VHTR).

More precisely, the invention relates to an assembly for exchanging heat between first and second fluids, the assembly being of the type comprising:

- an outer vessel presenting a central axis;
- a plurality of heat exchange modules between the primary and secondary fluids, which modules are distributed around the central axis inside the outer vessel and present respective side faces facing one another;
- at least one manifold for feeding the modules with primary fluid;
- at least one manifold for feeding the modules with secondary fluid;
- at least one manifold for collecting and discharging the primary fluid leaving the modules; and
- at least one manifold for collecting and discharging the secondary fluid leaving the modules.

Document JP 2004/144422 discloses a heat exchanger assembly of the above-specified type in which the secondary feed and discharge manifolds are disposed respectively at the periphery and at the center of the outer vessel, and in which the primary feed and discharge manifolds are disposed between the modules.

In such an assembly, the connections between the walls of the manifolds and the modules are subjected to very high stresses, which can lead to premature rupture of certain connections.

In this context, the invention seeks to propose a heat exchanger assembly in which thermomechanical stresses are smaller.

For this purpose, the invention relates to a heat exchanger assembly of the above-specified type, characterized in that at least some of said manifolds or portions of said manifolds extend between the modules placed successively around the central axis, said manifolds or portions of manifolds on opposite sides of a given module being disposed in substantially symmetrical manner about the midplane situated between the two side faces of said module so that said manifolds or portions of manifolds create substantially identical thermal stresses in the side faces of the module.

The assembly may also present one or more of the following characteristics taken individually or in any technically feasible combination:

- the assembly has a single secondary discharge manifold extending along the central axis of the outer vessel, the primary feed manifold(s) being disposed around the secondary discharge manifold, towards the inside of the outer vessel relative to the secondary feed manifolds and primary discharge manifolds;
- the primary feed manifolds and the secondary discharge manifolds serving a given module communicate with an end portion of said module facing towards the inside of the outer vessel, and the secondary feed manifold and the primary discharge manifold serving said module communicate with an end portion of said module facing towards the outside of the outer vessel;
- each module comprises a stack of plates between which the primary and secondary fluids flow in alternate layers;
- each module comprises a plurality of mutually distinct submodules, each module being served by at least one secondary feed manifold comprising pipework segments beside the submodules, and bellows interconnecting the pipework segments;
- each submodule communicates with the secondary discharge manifold via a connection, the connection and the pipework segments of the secondary feed manifold both presenting a hydraulic diameter of less than 500 millimeters (mm);
- the central axis of the outer vessel is vertical, the assembly including a ring for supporting the modules, which ring is suspended from the outer vessel, the support ring and the modules being free to expand thermally downwards relative to the outer vessel;
- each module comprises a continuous stack of cells for heat exchange between the primary and secondary fluids and capable of deforming relative to one another;
- the assembly comprises, between each pair of modules located successively around the central axis, a secondary distribution manifold defined at least in part by panels rigidly fastened to the side faces of the modules;
- the secondary discharge manifold is defined at least in part by the bottom end portions of the heat exchange modules;
- the first and second fluids are gases, the first gas being for penetrating into the outer vessel at a temperature higher than 700° C., and the second gas being designed to exit from the outer vessel at a temperature higher than 700° C.;
- the first fluid comprises a majority of helium, the second fluid comprising a majority of helium and/or nitrogen; and
- the first and second fluids are primary and secondary fluids of a high temperature or very high temperature nuclear reactor.

Other characteristics and advantages of the invention appear from the detailed description given below by way of non-limiting indication, and with reference to the accompanying figures, in which.

Figure 1:
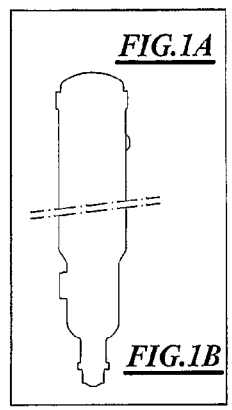
FIG. 1 is an axial section view of a heat exchange assembly in a first embodiment of the invention.
Figure 1A:
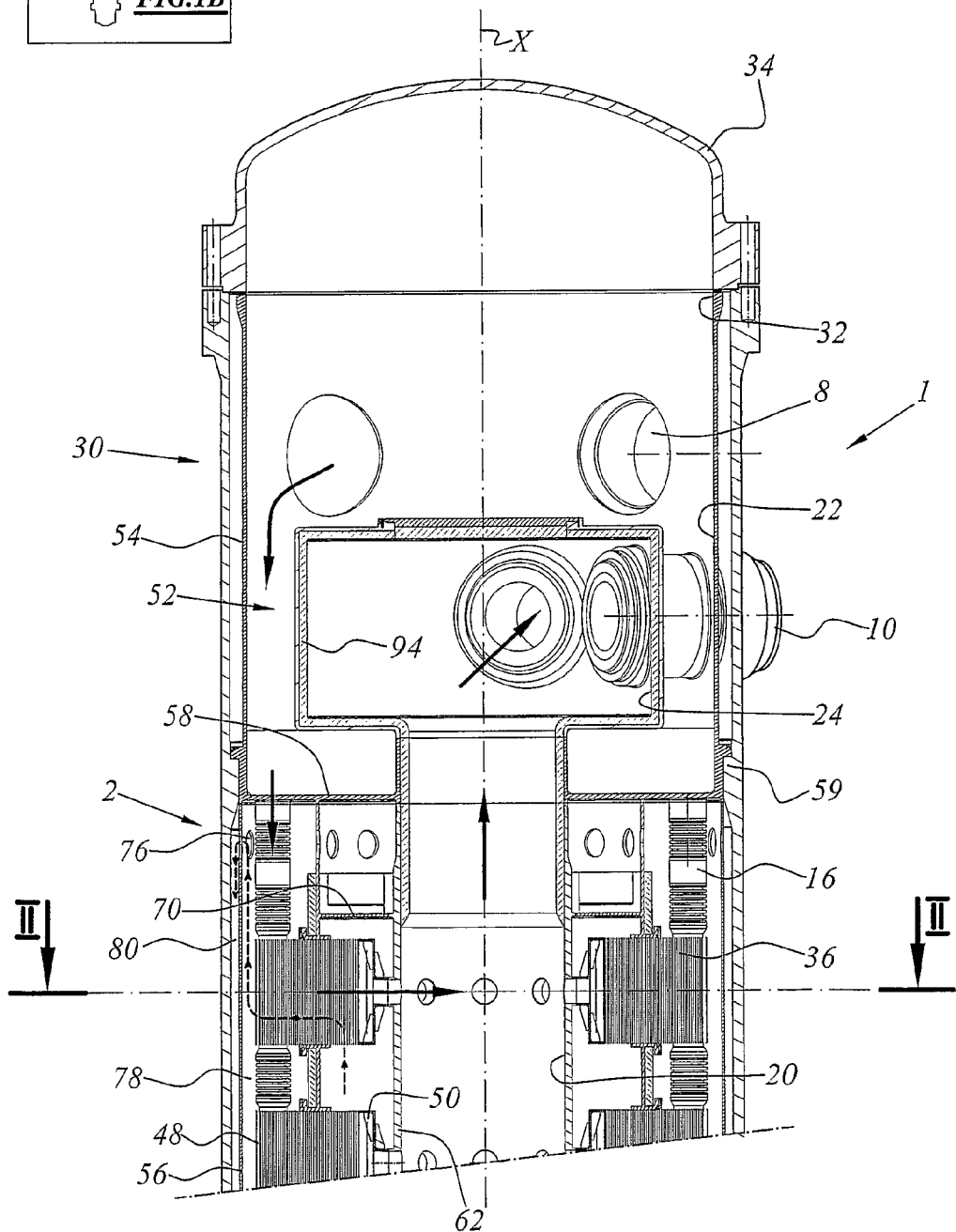
Figure 2:
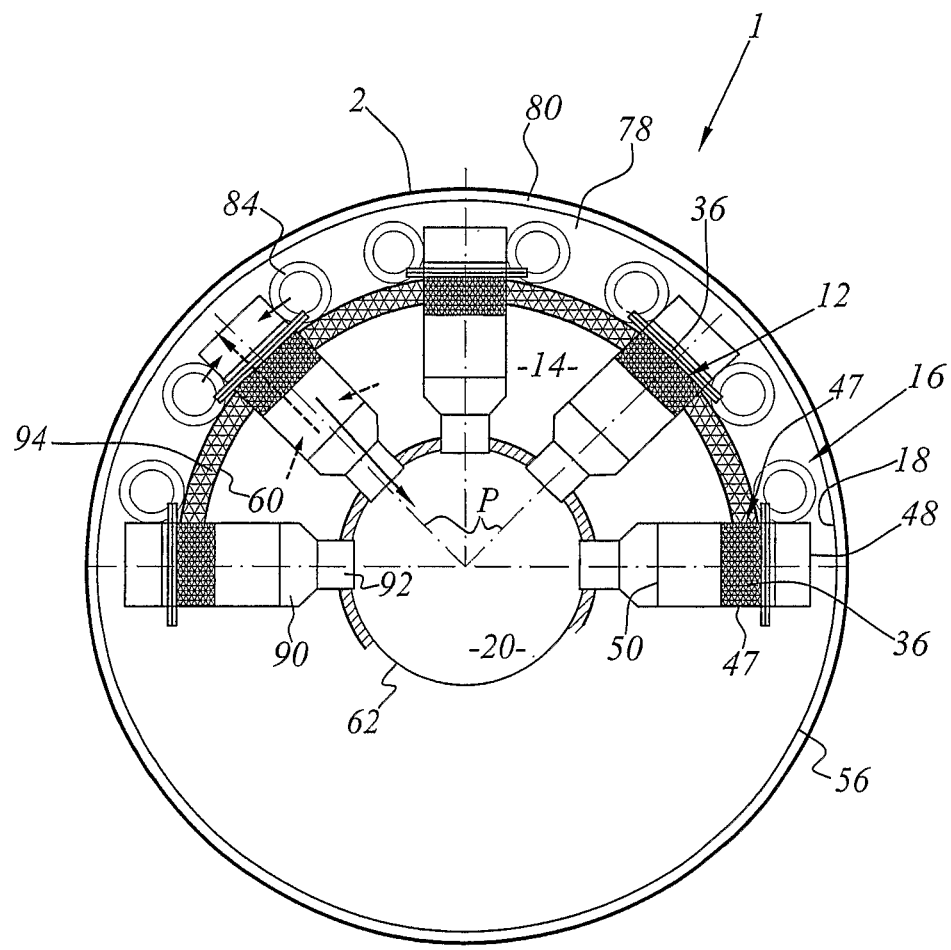
FIG. 2 is a section view in a plane perpendicular to the central axis of the FIG. 1 assembly, seen looking along arrows II in FIG. 1.

The assembly 1 shown in FIGS. 1 and 2 is for use in a high temperature or very high temperature nuclear reactor (HTR/VHTR) for exchanging heat between a first fluid and a second fluid.

The first fluid is the primary fluid of the nuclear reactor, and it flows through the reactor in a closed loop. It passes through the core of the nuclear reactor (not shown), and it then passes through the assembly 1 before finally returning to the inlet of the core. The primary fluid heats up in the core of the reactor, and by way of example it leaves it at a temperature of about 850° C. It gives up a fraction of its heat to the secondary fluid in the assembly 1, and it leaves it at a temperature of about 400° C., for example. The primary fluid is typically technically-pure gaseous helium.

The second fluid is the secondary fluid of the nuclear reactor, and it flows in a closed loop therethrough. It passes through the assembly 1 and the passes through a gas turbine for driving an electricity generator, after which it returns to the inlet of the assembly 1. The secondary fluid enters the assembly 1 at a temperature of about 350° C., for example, and it leaves at a temperature of about 800° C., for example. The secondary fluid is a gas comprising mainly helium and nitrogen.

The assembly 1 comprises:
- an outer vessel 2 presenting a substantially vertical central axis X provided with an inlet 4 and an outlet 6 for primary fluid, and four inlets 8 and four outlets 10 for secondary fluid;
- eight heat exchange modules 12 disposed inside the vessel 2, in which heat is exchanged between the primary and secondary fluids;
- an annular manifold 14 for feeding the modules 12 with primary fluid;
- manifolds 16 for feeding the modules 12 with secondary fluid;
- an annular manifold 18 for collecting and discharging the primary fluid leaving the modules 12;
- a central manifold 20 for collecting and discharging the secondary fluid leaving the modules 12;
- an inlet chamber 22 delivering the secondary fluid to the manifolds 16, and an outlet chamber 24 delivering the secondary fluid leaving the secondary discharge manifold 20 to the outlet 10;
- bottom internal equipment 26 channeling the primary fluid between the manifolds 14 and 18 on one side and the primary fluid inlet 4 and outlet 6 on the other; and
- a primary fluid circulator 28 fastened to the vessel 2.

The vessel 2 comprises a tank 30 having placed therein the heat exchangers 12 and the manifolds 14, 16, 18, and 20, presenting towards the top an opening 32, and a removable cover 34 for closing the opening 32 of the tank 30 in leaktight manner.

The secondary fluid inlets 8 are provided at the top of the tank 30 and they are regularly distributed around a common circumference thereof.

The secondary fluid outlets 10 are provided at the top of the tank 30, a little below the inlets 8, and they are regularly distributed around a common circumference of the tank.

Figure 1B:
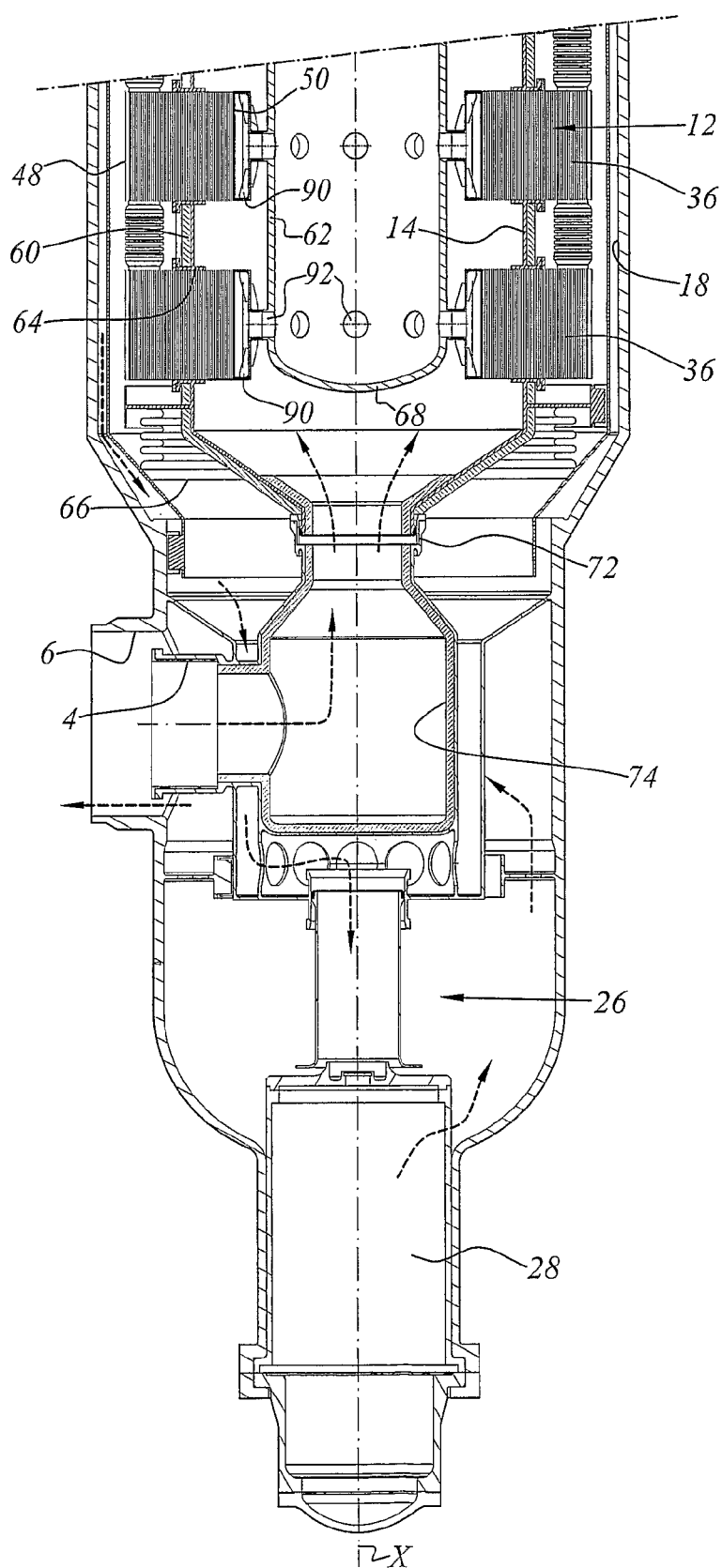

In its bottom portion, the tank 30 has a single branch connection through which the primary fluid inlet and outlet 4 and 6 pass. The inlet 4 and the outlet 6 are coaxial, as can be seen in FIG. 1B, with the outlet 6 surrounding the inlet 4.

The tank 30 is closed towards the bottom by a rounded bottom that presents a round central opening centered on the axis X, and in which the circulator 28 is fastened.

As can be seen in FIG. 2, the eight modules 12 disposed in a circle around the axis X, and they are regularly distributed thereabout.

In the first embodiment of the invention, corresponding to FIGS. 1 to 3A/3B, the heat exchangers 12 are heat exchangers of the plate type and they are of rigid structure. Each rigid module 12 comprises three mutually identical submodules 36.

Figure 7:
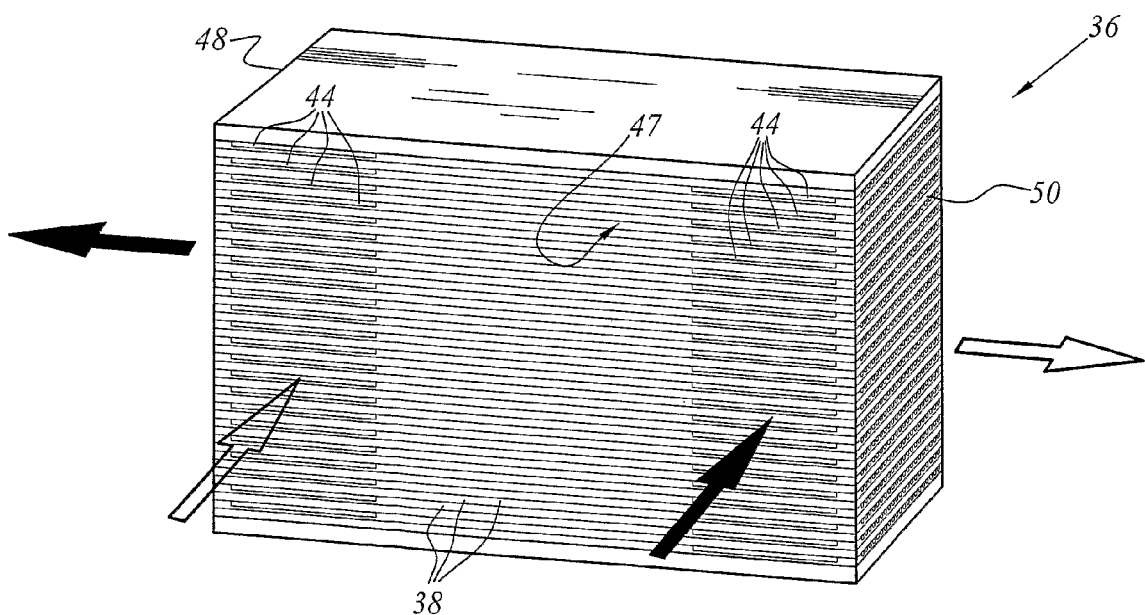
FIG. 7 is a perspective view of a heat exchange submodule of the FIG. 1 assembly, made up of the plates of FIG. 6.
Figure 6:
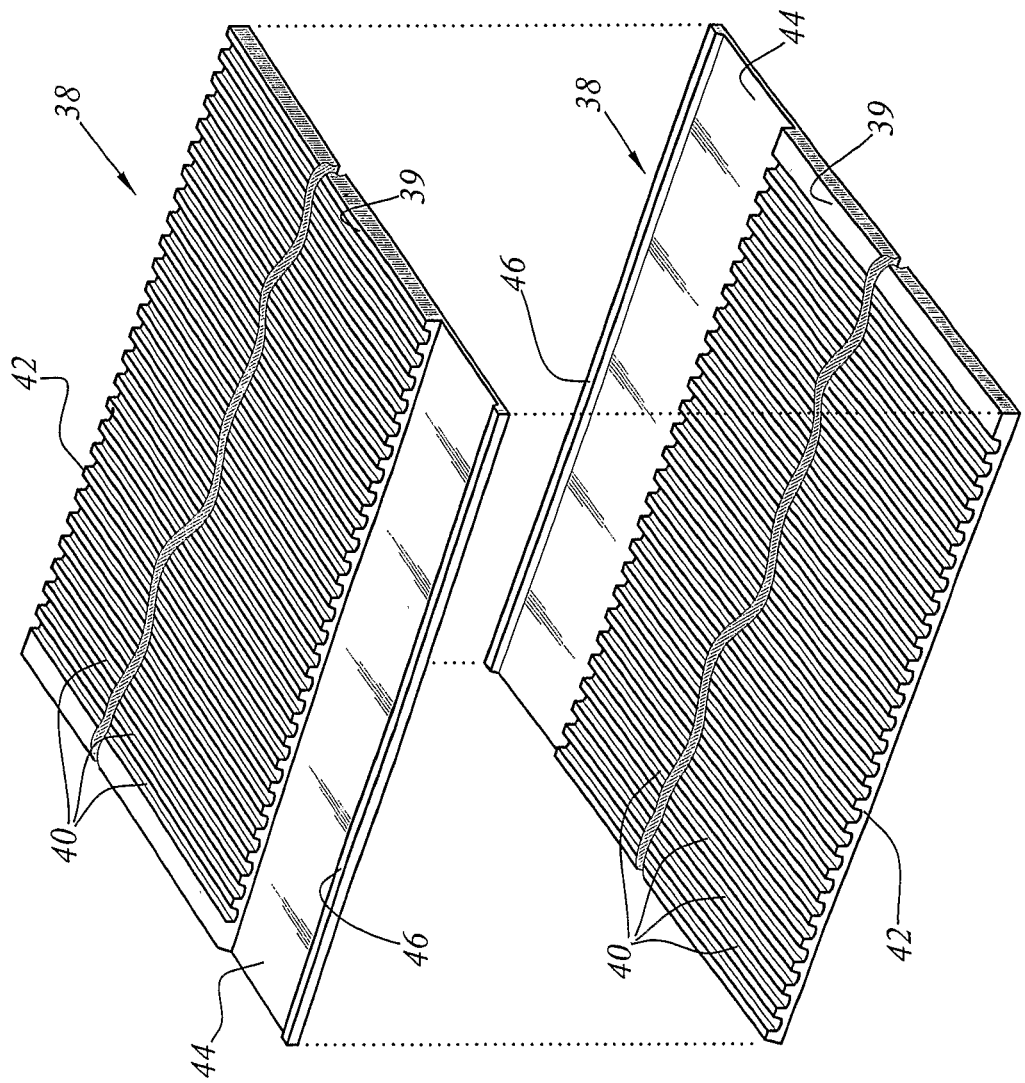
FIG. 6 is a perspective view of plates of the type forming the heat exchange modules of the FIG. 1 assembly.

By way of example, the heat exchange modules are of the plate machined heat exchanger (PMHE) type, in which case the submodules 36 are formed as shown in FIGS. 6 and 7.

Each submodule 36 is formed from plates 38 that are all identical, that are superposed, and that are disposed alternately in opposite directions, as can be seen in FIG. 6.

Each plate 38 has a top face 39 carrying a plurality of mutually parallel etched grooves 40 extending in a longitudinal direction. At a first end, each of these grooves 40 opens out into a transverse edge 42 of the plate. At their ends opposite from the edge 42, they all open out into a transverse groove 44 of large width that extends across the entire plate. This groove 44 is closed along the transverse edge 46 opposite from the edge 42, and it is open at its two opposite transverse ends.

The plates 38 of a given submodule are superposed, the top faces 39 facing upwards, such that the transverse grooves 44 are disposed in alternation at two opposite longitudinal ends of the submodule 36. They are welded or brazed to one another.

The first and second fluids flow in the grooves 40 and 44 of the plates 38 alternately in every other plate of the stack. Thus, as shown in FIG. 7, the first fluid (solid arrows) enters into the submodule 36 via the two open ends of the channels 44 situated at a first longitudinal end of the submodule 36. It penetrates into the submodule 36 via the two opposite side faces 47 of the submodule. It then travels along the channels 40, and leaves the submodule 36 via the transverse face 48 situated at a longitudinal end of the submodule 36 opposite from its first end.

The secondary fluid (hollow arrows in FIG. 7) penetrates into the submodule 36 via the open ends of the channels 44 situated at the second longitudinal end of the submodule 36, and leaves via the transverse face 50 situated at the first longitudinal end. The primary and secondary fluids flow at counterflows to each other inside the submodule 36.

In a variant, the heat exchange module 12 may be of the plate fin heat exchanger (PFHE) type. Under such circumstances, the longitudinal channels are not etched in the top face 39 of the plate 38, but are built up by welding mutually parallel fins on said top face, which fins define the channels 40 between one another.

As can be seen in FIG. 1, the three submodules 36 of a given heat exchange module 12 are superposed axially at a distance from one another. In order to facilitate maintenance of the heat exchange modules 12, they are collected together in a support basket 52 that can be extracted axially from the tank 30 through the opening 32.

The basket 52 has a top cylindrical ring 54 coaxial about the central axis X and defining internally the secondary fluid inlet chamber 22, a bottom cylindrical ring 56 likewise coaxial about the central axis X, and a plate 58 separating the rings 54 and 56 and substantially perpendicular to the central axis X.

The basket 52 is suspended via the plate 58 from a shoulder 59 formed inside the tank 30.

The secondary fluid outlet chamber 24 is situated inside the chamber 22.

The basket 52 also has a ring 60 for supporting the heat exchange modules 12, and an inner ring 62 defining the secondary fluid discharge manifold 20.

The cylindrical ring 60 is suspended under the separation plate 58, and is coaxial about the central axis X. The submodules 36 are fastened by any appropriate means in windows 64 that are cut out in the ring 60 (see also FIG. 8). The transverse secondary fluid outlet face 48 and the primary fluid inlet channels 44 are situated radially inside the ring 60. The transverse primary fluid outlet face 50 and the secondary fluid inlet channels 44 are situated radially outside the ring 60.

The annular space defined between the bottom ring 56 and the support ring 60 is closed towards the top by the separation plate 58, and towards the bottom by an annular metal bellows system 66 that is axially compressible.

The inner ring 62 is closed downwards by a rounded bottom 68. Upwards it passes through the plate 58 and opens out into the secondary fluid outlet chamber 24.

The annular space extending between the support ring 60 and the inner ring 62 forms the primary feed manifold 14. It is closed towards the top by an annular plate 70 that extends at a distance below the separation plate 58. In its bottom portion it communicates via a removable leaktight coupling 72 with an intermediate manifold segment 74 that is coaxial about the central axis X, itself communicating radially with the primary fluid inlet 4. The coupling 72 enables the ring 60 to be uncoupled from the manifold segment 74 when the basket 52 is withdrawn from the tank 30.

The bottom ring 56 carries primary fluid flow orifices 76 formed at a small distance below the plate 58. The orifices 76 put the annular space 78 situated between the rings 56 and 60 into communication with the annular space 80 defined between the ring 56 and the outer vessel 2. These two annular spaces together form the primary discharge manifold 18. The annular space 80 is closed towards the top in leaktight manner by the connection between the plate 58 and the outer vessel 2. The annular space 80 is downwardly open. The bottom internal equipment 26 is disposed in such a manner as to form a path enabling the primary fluid to go from the bottom of the annular space 80 to the inlet of the circulator 28 and then to leave the circulator 28 and go to the primary fluid outlet 6 (FIG. 1).

Figure 3A:
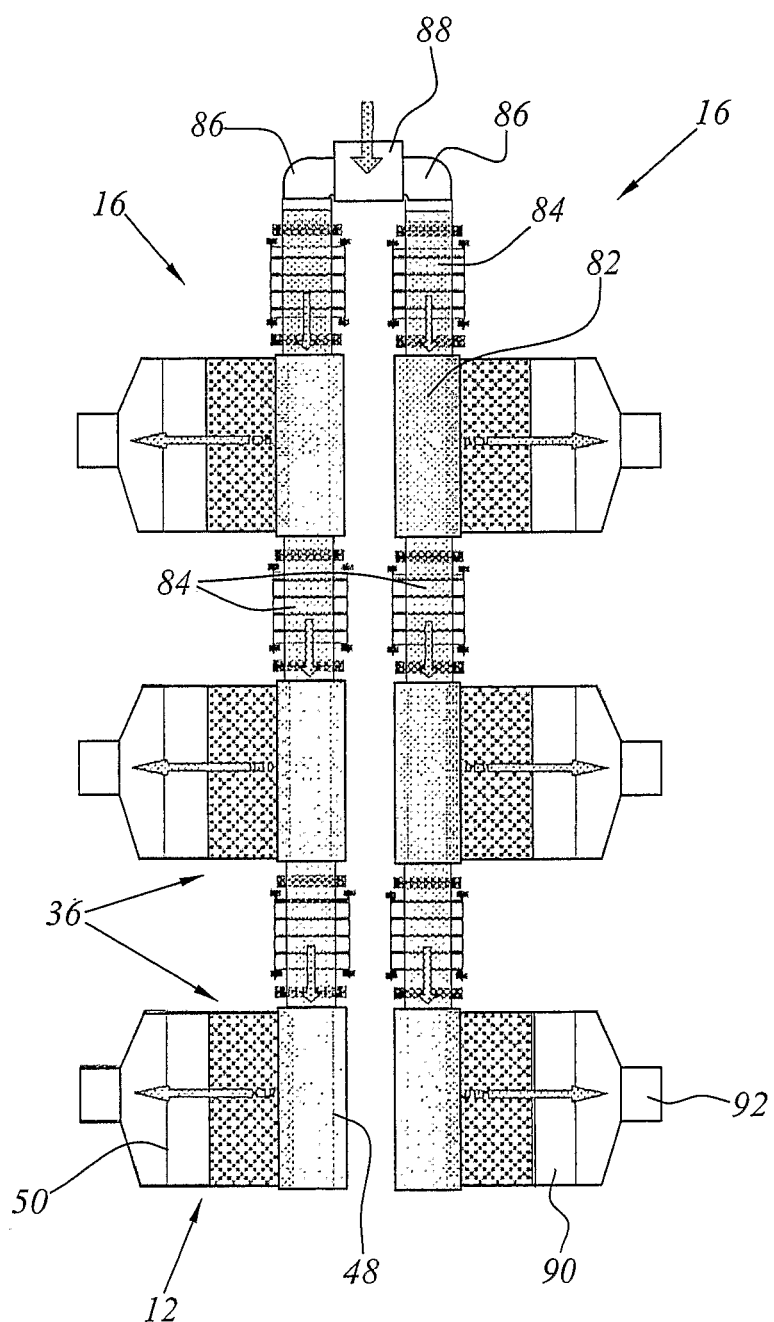
FIG. 3A is an elevation view of two heat exchange modules of FIG. 1 and of two secondary feed manifolds serving the modules.

The assembly 1 has sixteen secondary feed manifolds 16 disposed in the annular space 78 between the rings 56 and 60, extending parallel to the central axis X. As shown in FIGS. 2 and 3A, each heat exchange module 12 is served by two secondary feed manifolds 16, each manifold 16 feeding the three superposed submodules 36 of the module 12. The two manifolds 16 serving a common module 12 extend along two opposite side faces 47 of the submodules 36.

Figure 8:
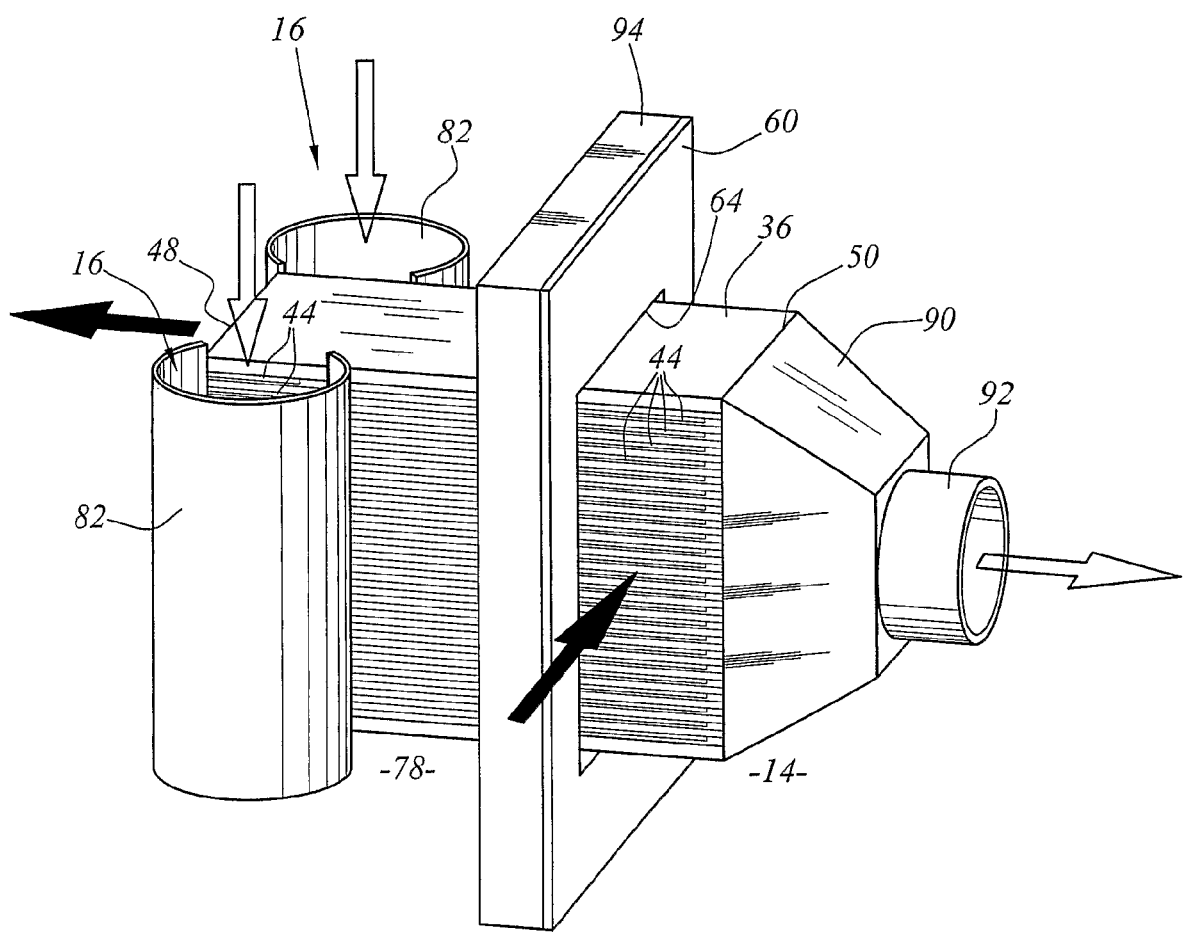
FIG. 8 is a perspective view of the FIG. 7 submodule, mounted on its support ring and having fitted thereto the connection branch to the secondary discharge manifold, together with segments of the pipework of the secondary feed manifolds.

As shown in FIG. 3, each manifold 16 has three rigid pipework segments 82, each adjacent to and rigidly secured to a side face 47 of one of the submodules 36, and interconnected by axially compressible bellows 84. As shown in FIG. 8, the pipework segments 82 are beside zones of two opposite transverse faces 47 of a given submodule and they communicate with the ends of the transverse channels 44 for secondary fluid inlet.

Figure 3B:
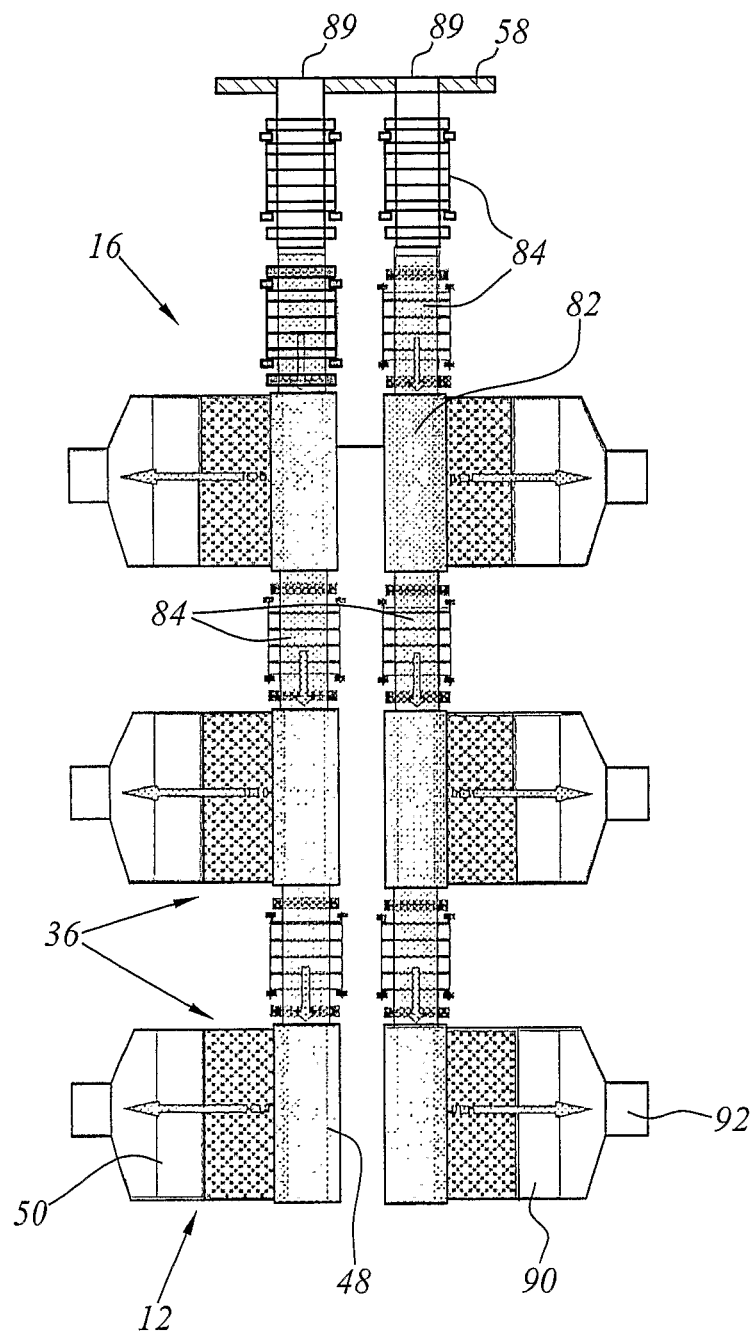
FIG. 3B is a view similar to FIG. 3A for a variant embodiment of the secondary feed manifolds.

As shown in FIGS. 2 and 3A, the two secondary distribution manifolds 16 located between two consecutive heat exchange modules 12 have top pipe bends 86 that have respective segments 88 passing through the separation plate 58 to connect and communicate with the secondary feed chamber 22. The pipe bends 86 are connected to the highest pipework segments 82, each via another axially compressible bellows 84. All of the manifolds 16 are closed at their bottom ends. The top bellows 84 can be adapted or duplicated to accommodate movements due to radial thermal expansion. The pipe bends 86 may be omitted. Under such circumstances, the top bellows are fitted with tubes 89 providing connections with the secondary feed manifold 22 via the plate 58 (FIG. 3B).

Each submodule 36 comprises a housing 90 completely covering the transverse secondary fluid outlet face 50, the housing 90 being connected to the secondary discharge manifold 20 via pipework 92 of small diameter.

Finally, the hot portions of the assembly 1, i.e. the portions in which the primary fluid flows prior to passing through the heat exchange modules 12 and in which the secondary fluid flows on leaving the heat exchange modules 12 are isolated from cold portions of the assembly 1 by a layer of lagging 94. As shown clearly in FIG. 1, these hot portions are situated at the center of the assembly 1, along the central axis X of the vessel 2. Thus, the lagging 94 is disposed around the primary fluid inlet 4, the intermediate manifold segment 74, the support ring 60, the annular plate 70, the outlet chamber 24, and the segment of the secondary discharge manifold 20 that extends between the annular plate 70 and the chamber 24.

The flow of primary and secondary fluids in the above-described heat exchange assembly 1 is described in detail in the following paragraphs with reference to FIG. 1.

The primary fluid (dashed-line arrows in FIG. 1) penetrates into the assembly 1 via the inlet 4, passes through the intermediate manifold segment 74 and rises axially along the primary distribution manifold 14, around the secondary discharge manifold 20.

As shown in FIGS. 1 and 8, it then penetrates into the submodules 36 via the open ends of the transverse channels 44, passes through the submodules 36, giving up its heat to the secondary fluid, leaves the submodules 36 via the transverse face 48, rises axially in the annular space 78, passes through the orifices 76 and into the annular space 80, moves axially back down along the annular space 80, and is then channeled by the bottom internal equipment 26 to the circulator 28 from which it is expelled to the primary outlet 6.

The secondary fluid enters the assembly 1 via the inlets 8 and is distributed by the chamber 22 into the sixteen secondary feed manifolds 16. It travels axially downwards in the manifolds 16, penetrates into the submodules 36 via the open ends of the transverse channels 44, passes radially from the outside towards the inside of the assembly 1 through the submodules 36 where it is heated by the heat given up by the primary fluid, leaves the submodules 36 via the face 50, passes through the housings 90 and the connections 92, penetrates into the secondary discharge manifold 20, and is then channeled by the secondary discharge manifold 20 upwards along the central axis to the outlet chamber 24 which delivers the secondary fluid to the various secondary outlets 10.

The heat exchange assembly described above presents multiple advantages.

The manifolds or manifold portions surrounding a given module are all disposed substantially symmetrically relative to the midplane P of the two side faces of the module, so that the thermal stresses created in the side faces of the module are substantially identical. The thermal expansions of the two side faces of the module are therefore similar. The heat exchange modules are therefore not subjected to warping in the circumferential direction. On the contrary, they remain substantially symmetrical relative to the midplane between their side faces. As a result, the thermomechanical stresses in the support ring for the heat exchange modules are reduced.

In the embodiment shown in FIGS. 1 to 3A/3B, the two side faces of a module are parallel, and the midplane P is the plane parallel to the side faces that is equidistant from those two faces and that contains the central axis X of the enclosure.

More generally, each midplane P extends in central manner between the two side faces of each module.

Furthermore, the stresses generated by axial thermal expansion of the modules and of the support ring are minimized by various constructional arrangements.

The fact of separating the modules 12 into a plurality of axially superposed submodules 36 that are separated from one another makes it possible to minimize the stresses induced by axial expansion of the modules in the support ring. Furthermore, the support ring 60 is suspended from the plate 58 and is therefore free to expand thermally downwards. This freedom is imparted thereto in particular by the fact that the annular space 78 between the support ring 60 and the bottom ring 56 is closed downwardly by a bellows 66 that can deform axially. The submodules 36 can move axially because bellows 84 are interposed between the various submodules 36 along the secondary feed manifolds, and because the submodules 36 are connected to the secondary discharge manifolds via connections 92 of small section.

The fact of the secondary discharge manifold and the primary feed manifold being brought together in the center of the outer vessel is favorable in terms of keeping the outer vessel 2 at a moderate temperature. Both of these two manifolds convey gas at more than 700° C., typically more than 800° C. The primary discharge manifold and the secondary feed manifold which are located at the periphery of the outer vessel 2 convey gas at a temperature that is much lower, e.g. in the range 400° C. to 500° C.

The use of a large number of secondary feed manifolds, here two manifolds per module, both being of tubular shape, makes it possible firstly to maintain the speed of the gas at a level that is sufficiently low, of the order of 34 meters per second (m/s), and to use pipework of small hydraulic diameter, e.g. less than 50 mm for each secondary feed manifold. Keeping the flow speed of the gases at a level that is moderate is favorable for the thermohydraulic behavior of the heat exchange modules. Using tubular secondary feed manifolds of small diameter is favorable for the ability of these manifolds to withstand pressure, in particular under accidental circumstances in the event of the primary circuit or the secondary circuit rupturing, when the pressure difference between the primary and secondary circuits may exceed 5 megapascals (MPa).

Advantageously, the connections 92 also present a hydraulic diameter of less than 500 mm, for the same reason.

Furthermore, the use of small-diameter pipework makes it possible to interpose bellows between the manifold segments that are fastened rigidly to the submodules 36.

Figure 4A:
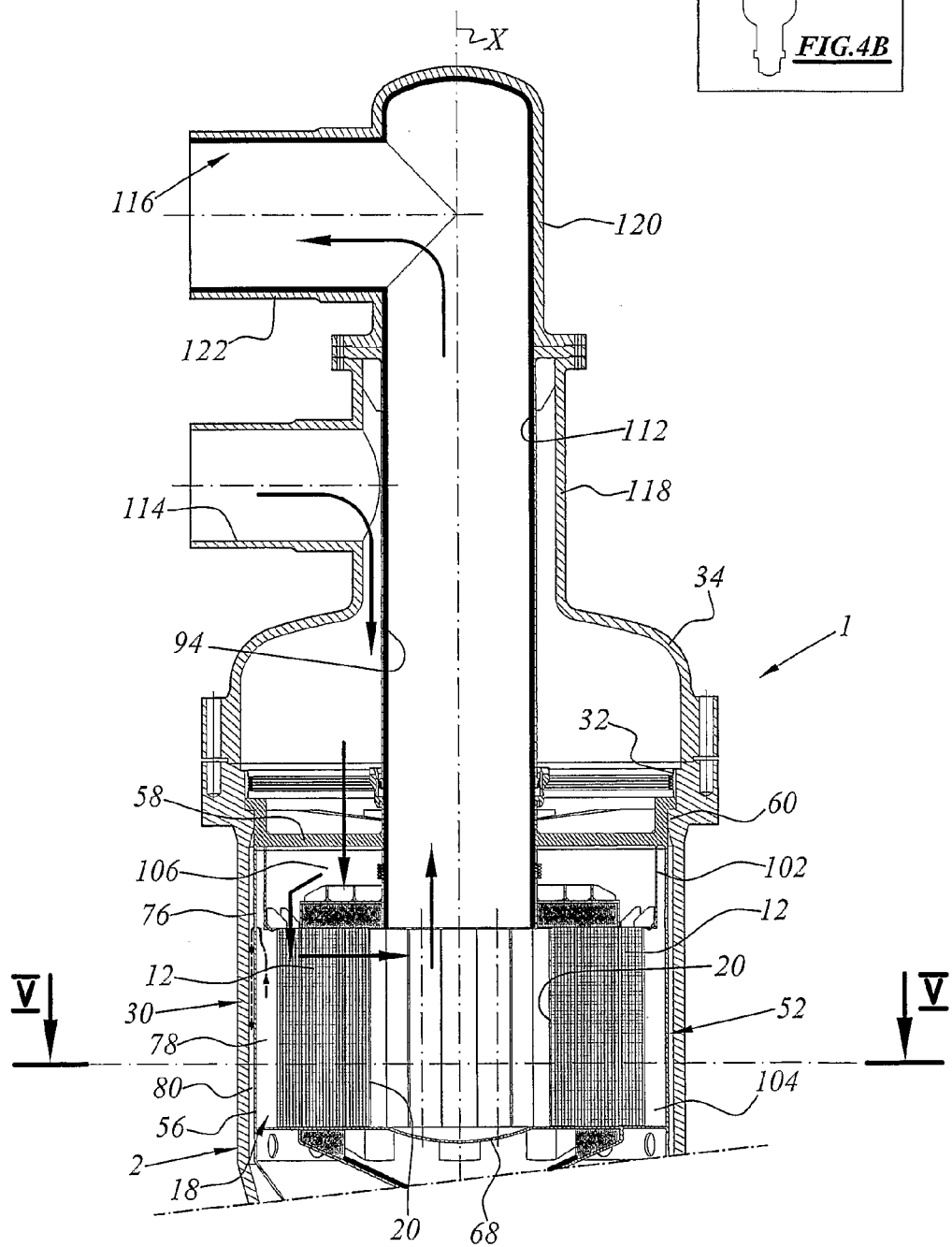
FIG. 4 is an axial section view of a heat exchange assembly in a second embodiment of the invention.
Figure 4B:
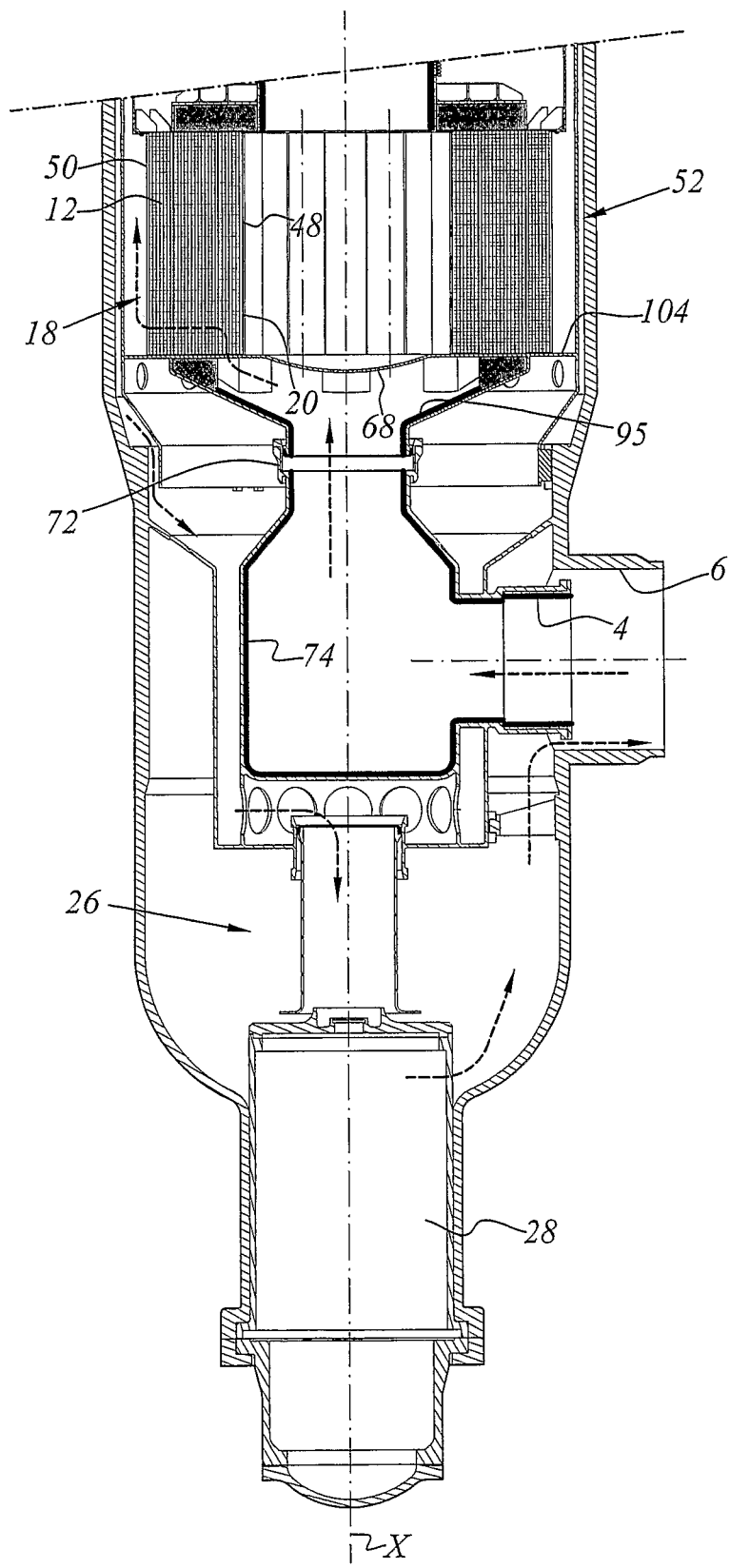
Figure 5:
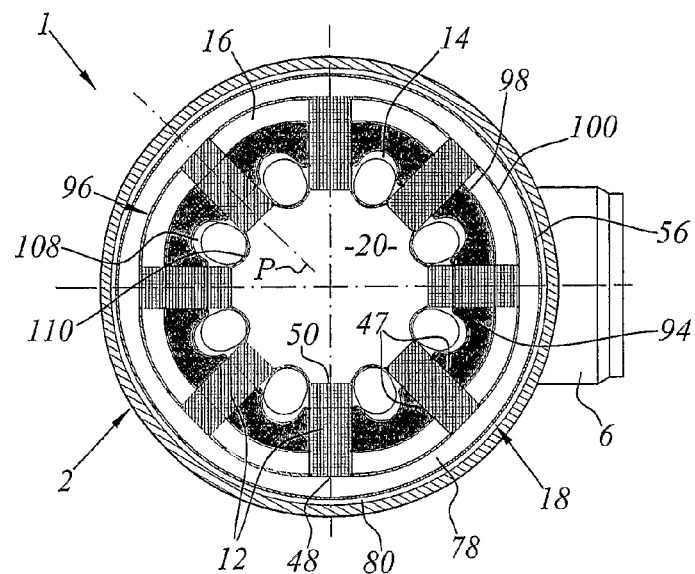
FIG. 5 is a section view in a plane perpendicular to the central axis of the FIG. 4 assembly, seen looking along arrows V in FIG. 4.

A second embodiment of the invention is shown in FIGS. 4 and 5.

Figure 9:
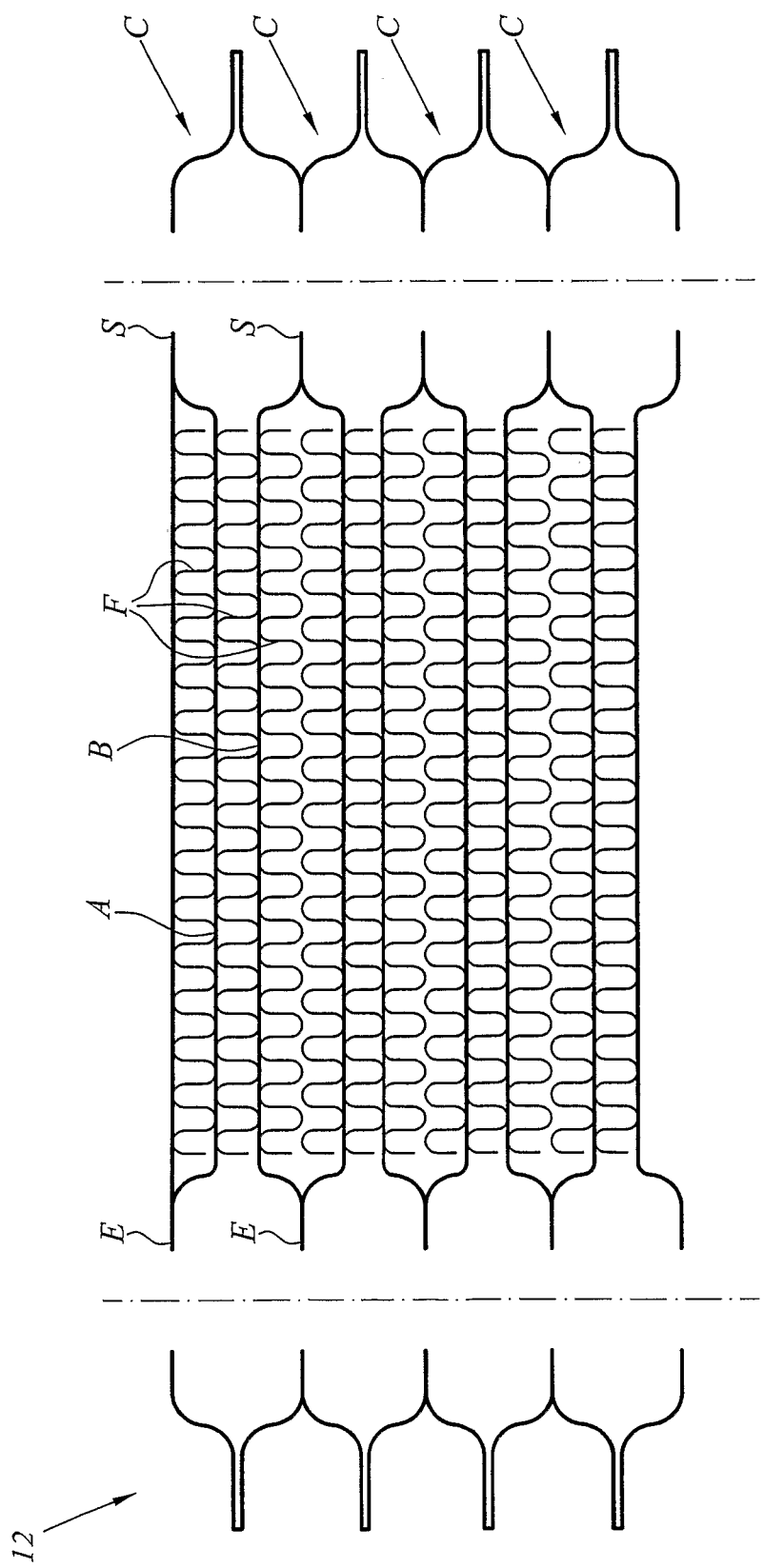
FIG. 9 is a section view of a heat exchanger module of the FIG. 4 assembly.

In this second embodiment, the heat exchange modules are plate heat exchangers of the type described in patent U.S. Pat. No. 5,983,992 and as shown in FIG. 9. This heat exchanger comprises a plurality of heat exchange cells C that are stacked on one another. Each cell C comprises a top plate A having a fluid inlet E cut out in a first end thereof and having a fluid outlet S cut out in an opposite end thereof. The cell C also has a bottom plate B extending substantially parallel to the top plate A and having inlets and outlets E and S cut out therein, the inlets of the top and bottom plates being in alignment, as are the outlets. As shown in FIG. 9, the plates A and B are welded together via their peripheral edges. The inlets and outlets E and S of the top plate A are surrounded by a margin projecting relative to the inside of the cell C, i.e. projecting from a side opposite from the plate B. Symmetrically, the inlets and outlets E and S of the bottom plate B project outwards from the cell, i.e. from a side opposite from the top plate A. A corrugated metal sheet F is disposed between the plates A and B and is welded to the plates. It forms an array of fins inside the cell C. A second corrugated metal sheet F of the same type is also welded to the face of the plate A that faces towards the outside of the cell C. A third corrugated metal sheet F is welded to the face of the plate B that faces towards the outside of the cell C.

The cells C are stacked on one another and connected together via the projecting margins of their respective inlets and outlets. The cells are placed in such a manner that the inlets and the outlets of all of the cells C are in alignment.

The first fluid enters the cells C via the inlets E, flows through the channels defined by the corrugated sheets F that are placed inside each cell, and leave via the outlets S. The second fluid flows in the space defined between the cells C.

The heat exchange modules made in this manner present the characteristic of each cell being capable of moving relative to the adjacent cells and of deforming, e.g. by compression, bending, or extension.

FIGS. 4 and 5 show a heat exchange assembly in which the modules are flexible plate heat exchangers of the type shown in FIG. 9. The description below relates only to the differences between this assembly forming the second embodiment of the invention and the assembly of FIGS. 1 to 3A/3B forming the first embodiment of the invention.

Elements that are identical or that perform similar functions are given the same references in both embodiments.

As can be seen in FIG. 4, the heat exchange modules 12 are no longer subdivided into a plurality of submodules 36, but on the contrary they are one-piece units, each made up of a continuous stack of cells through which the primary and second fluids flow.

Each of the heat exchange modules 12 is in the form of a rectangular parallelepiped. The primary and secondary fluids enter a module 12 respectively via radially inner and radially outer zones of the side faces 47 of the module.

Furthermore, the assembly 1, unlike in the first embodiment, does not include a single primary fluid feed manifold for the modules 12, of annular shape and surrounding the secondary discharge manifold, but on the contrary has eight separate primary feed manifolds 14 extending axially between the modules 12, and opening out into a distribution chamber 95 situated beneath the modules 12. The chamber 95 communicates with the intermediate manifold segment 74. Each manifold 14 serves the two heat exchange modules 12 on either side thereof. Each module is defined radially inwards by a transverse secondary fluid outlet face 50, radially outwards by a transverse primary fluid outlet face 48, and sideways by faces 47 that face towards the adjacent modules.

Between each pair of modules 12 disposed successively around the central axis X, the support structure 96 for the modules 12 comprises two panels 98 and 100 in the form of cylindrical sectors that are coaxial about the central axis and that extend over the full axial height of the modules 12. These panels are welded to the side walls 47 facing the two modules 12 on either side thereof. The panels 100 extend substantially radially past the outer transverse faces 48 of the modules 12 through which the primary fluid is discharged. The panels 98 are interposed radially between the panels 100 and the primary feed manifolds 14.

The assembly formed by the modules 12 and the panels 98 and 100 is suspended from the separation plate 58 by a cylindrical ring 102.

Furthermore, the annular space 78 is closed downwards by an annular plate 104.

The assembly 1 has eight secondary feed manifolds 16 that are disposed between the modules 12 and that are defined by the panels 98 and 100 and by the side faces 47 of the modules 12. Each manifold 16 serves the modules 12 on either side thereof.

The secondary fluid is distributed in the feed manifolds 16 from a chamber 106 formed by the space inside the ring 102.

Each primary feed manifold 14 presents a section that is substantially oval in a plane that is perpendicular to the central axis of the outer vessel 2.

Each manifold 14 is defined by two concave panels 108 and 110 with their concave sides facing each other, and extending over the full axial height of the modules 12. The panels 108 and 110 are welded to the side faces 47 of the modules on either side thereof. The panels 110 extend substantially level with the inner transverse faces 50 of the modules 12. Thermal insulation 94 fills the space between the concave panel 108 and the panel 98 in the form of a sector of a ring.

As in the first embodiment of the invention, the secondary discharge manifold 20 extends along the central axis of the assembly 1. It is defined circumferentially by the inner transverse faces 50 of the modules 12 alternating with the concave panels 110. The hot secondary gas thus exits directly from each module 12 into the secondary discharge manifold 20. The secondary manifold 20 is defined downwards by a rounded bottom 68 that separates it from the primary distribution chamber 95. It is extended axially upwards by a large-diameter discharge pipe 112 that passes through the secondary distribution chamber 106 and the separation plate 58.

The secondary fluid inlet and outlet 114 and 116 are made in a central cylindrical ring 118 carried by the cover 34 of the heat exchange assembly. This ring 118 extends around the central axis X of the assembly 1. The inlet 114 is connected radially to the ring 118. The secondary outlet 116 has a bend, and comprises an axial length of pipe 120 extending in line with the ring 118, followed by a portion 122 extending radially relative to the axial portion 120. The secondary discharge pipe 112 connects the axial portion 120 to the secondary discharge manifold 20.

The secondary distribution chamber 106 communicates through orifices (not shown) made in the separation plate 58 with the space inside the cover 34, which in turn communicates with the secondary fluid inlet 114.

The flow of the primary and second fluids through the assembly 1 is described below with reference to FIG. 4.

The primary fluid (dashed-line arrows in FIG. 4) penetrates into the vessel 2 via the inlet 4, passes through the intermediate manifold segment 74, and penetrates into the distribution chamber 94 from which it is distributed amongst the eight primary feed manifolds 14. It penetrates sideways into the modules 12 and leaves radially via the outer transverse faces 48 thereof, penetrating into the annular space 78. It rises along the annular space 78 as far as the orifices 76 and then comes back down along the annular space 80. The internal equipment 26 then channels it to the suction side of the circulator pump 28, and it goes from the discharge of the circulator pump 28 to the primary outlet 6.

The secondary fluid penetrates into the assembly 1 via the secondary inlet 114, passes through the cover 34 and the separation plate 58, and penetrates into the secondary distribution chamber 106 from which it is distributed amongst the eight secondary feed channels 16. It penetrates sideways into the modules 12 and leaves the modules 12 through the inner transverse faces 50 of the modules that open out into the secondary discharge manifold 20. Thereafter it rises along this manifold and the discharge pipe 112, going to the secondary outlet 116.

As above, lagging 94 is placed around the hottest portions of the assembly 1, i.e. the portions through which the primary fluid flows before passing through the heat exchange modules 12, and the portions through which the secondary fluid flows after leaving the heat exchange modules 12. As can be seen in FIG. 4, the lagging is disposed along the primary fluid inlet 4, the intermediate manifold segment 74, the primary distribution chamber 95, between the panels 98 and 108, along the secondary discharge pipe 112, and along the secondary outlet 116.

The second embodiment of the invention also presents multiple advantages.

As in the first embodiment, the manifolds on either side of a given module are arranged in a manner that is substantially symmetrical relative to the midplane P between the two side faces of said module and containing the central axis X, such that these manifolds give rise to thermal stresses in the side faces of the module that are substantially identical. The modules therefore do not warp in the circumferential direction of the assembly 1. The panels 98, 100, 108, and 110 interconnecting two successive modules are therefore subjected to minimal thermomechanical stresses.

Furthermore, the fact that the heat exchange modules 12 are of the flexible type means that these modules are subjected to much less axial thermal expansion than in the first embodiment. The stresses imposed on the panels 98, 100, 108, and 110 as a result of the axial expansion of the modules 12 are therefore moderate, in order to close the annular space 78 at the bottom of the modules 12, so there is no need to provide a bellows like the bellows 66 in the first embodiment. Nor is there any need to provide a specific ring connected via connections to the modules 12, as with the ring 62, in order to define the secondary discharge manifold 20. The manifold can be made in much simpler and more economic manner by the inner transverse faces 50 of the modules 12 and by the panels 110 defining part of the primary distribution manifolds.

In the second embodiment, the assembly 1 is particularly compact because the heat exchange modules are one-piece units, because of the arrangement of the secondary inlets and outlets 114 and 116, and because of the arrangement of the distribution chambers 95 and 106.

As in the first embodiment, the hottest portions of the assembly 1 are situated along the central axis, so that the outer vessel 2 is maintained at a moderate temperature.

The above-described assembly can present multiple variants.

It may have more or fewer than eight heat exchange modules 12, for example it could have four, six, ten, or twelve, or even more.

In the first embodiment of the invention, each module 12 may have more or fewer than three submodules, for example, two, or four, or more than four.

The number of manifolds may be different from that specified above. Each module may be served by a manifold of each type (feed/discharge, primary/secondary), by two manifolds of each type, or even by more than two such manifolds. A single manifold can be dedicated to a single module, or it can serve two modules, or it may serve all of the modules.

The modules are not necessarily in the form of rectangular parallelepipeds, but they could have any other appropriate geometrical shape (a section that is lozenge-shaped, hexagonal, . . . ).

The enclosure may present a plurality of primary fluid inlets and outlets that are coaxial or not coaxial. It may have more or fewer than four secondary fluid inlets and outlets, that may be coaxial or not coaxial.

The primary fluid need not be technically pure helium, but could be a mixture of helium and nitrogen.

The secondary fluid could be technically pure helium, or a mixture of helium and nitrogen (e.g. 20% helium and 80% nitrogen, or 40% helium and 60% nitrogen).

The invention claimed is:

1. A heat exchange assembly in which heat is exchanged between primary and second fluids, the assembly comprises:
    an outer vessel presenting a central axis;
    a plurality of heat exchange modules in which heat is exchanged between the primary fluid and the secondary fluid, which modules are distributed around the central axis inside the outer vessel, each module having opposite first and second side faces, the side face of each module facing the second side face of the each module located next around the central axis, a respective midplane being situated between the first and second side faces of each module;
    a plurality of manifolds, comprising:
        at least one primary feed manifold for feeding the modules with primary fluid;
        at least one secondary feed manifold for feeding the modules with secondary fluid;
        at least one primary feed manifold for collecting and discharging the primary fluid leaving the modules; and
        at least one secondary collect manifold for collecting and discharging the secondary fluid leaving the modules;
    wherein at least some of said manifolds or portions of said manifolds extend between the modules placed successively around the central axis, the manifolds or the portions of manifolds extending along the first side faces of a particular given module being of a given type and being disposed in a given manner, the manifolds or the portions of the manifolds extending along the second side face of said particular given module being of the same type as the manifolds of the portions of the manifolds extending along the first side face, the manifolds or the portions of the manifolds extending along the first side face of said particular given module being disposed in a substantially symmetrical manner about the midplane of said particular given module with respect to the manifolds or the portions of the manifolds extending along the first side face so that said manifolds or the portions of manifolds create substantially identical thermal stresses in the first and second side faces of said particular given module.

2. An assembly according to claim 1, having a single secondary fluid discharge manifold extending along the central axis of the outer vessel, the primary feed manifold (s) being disposed around the secondary fluid discharge manifold, towards the inside of the outer vessel relative to the secondary feed manifolds and primary discharge manifolds.

3. An assembly according to claim 1, wherein the primary feed manifolds and the secondary fluid discharge manifolds serving a given module communicate with an end portion of said module located towards the center of the outer vessel, and the secondary feed manifold and the primary discharge manifold serving said module communicate with an end portion of said module located towards the periphery of the outer vessel.

4. An assembly according to claim 1, wherein each module comprises a stack of plates between which the primary and secondary fluids flow in alternate layers.

5. An assembly according to claim 4, wherein each module comprises a plurality of mutually distinct submodules, each module being served by at least one secondary feed manifold comprising pipework segments beside the submodules, and bellows interconnecting the pipework segments.

6. An assembly according to claim 5, wherein each submodule communicates with the secondary discharge manifold via a connection, the connection and the pipework segments of the secondary feed manifold presenting a hydraulic diameter of less than 500 mm.

7. An assembly according to claim 5, wherein the central axis of the outer vessel is vertical, the assembly including a ring for supporting the modules, which ring is suspended from the outer vessel, the support ring and the modules being free to expand thermally downwards relative to the outer vessel.

8. An assembly according to claim 4, wherein each module comprises a continuous stack of cells for heat exchange between the primary and secondary fluids and capable of deforming relative to one another.

9. An assembly according to claim 8, comprising, between each pair of modules located successively around the central axis, a secondary distribution manifold defined at least in part by panels rigidly fastened to the side faces of the modules.

10. An assembly according to claim 8, wherein the secondary discharge manifold is defined at least in part by the bottom end portions of the heat exchange modules.

11. An assembly according to claim 1, wherein the first and second fluids are gases, the first gas being for penetrating into the outer vessel at a temperature higher than 700° C. and the second gas being designed to exit from the outer vessel at a temperature higher than 700° C.

12. An assembly according to claim 11, wherein the first fluid comprises a majority of helium, the second fluid comprising a majority of helium and/or nitrogen.

13. An assembly according to claim 1, wherein the first and second fluids are primary and secondary fluids of a high temperature or very high temperature nuclear reactor.

14. An assembly according to claim 1, wherein the at least one primary feed manifold extends along the first side face of each module, and at least another primary feed manifold extends along the second side face of each module.

15. An assembly according to claim 1, wherein the at least one primary feed manifold and the at least one secondary feed manifold extend along the first side face of each module, and at least another primary feed manifold and at least another secondary feed manifold extends along the second side face of each module.

16. An assembly according to claim 1, wherein the opposite first and second side faces of each given module are parallel to one another, the midplane of the given module containing the central axis of the outer vessel and being substantially parallel to said first and second side faces of the module.

* * * * *